(12) United States Patent
de Pauw et al.

(10) Patent No.: US 7,584,899 B2
(45) Date of Patent: Sep. 8, 2009

(54) HVAC CONTROLLER

(75) Inventors: Jurianus de Pauw, Emmen (NL);
Joseph E. Oberdorf, Leiden (NL);
Antonius A. M. Smets, Eindhoven (NL);
Mark W. Peterson, Annandale, MN (US)

(73) Assignee: Honeywell International Inc., Morristown, NJ (US)

( * ) Notice: Subject to any disclaimer, the term of this patent is extended or adjusted under 35 U.S.C. 154(b) by 351 days.

(21) Appl. No.: 11/539,850

(22) Filed: Oct. 9, 2006

(65) Prior Publication Data

US 2007/0084941 A1   Apr. 19, 2007

Related U.S. Application Data

(63) Continuation of application No. 10/791,043, filed on Mar. 1, 2004, now Pat. No. 7,140,551.

(51) Int. Cl.
*G05D 23/00* (2006.01)
(52) U.S. Cl. .............. 236/94; 62/125; 165/11.1
(58) Field of Classification Search ............ 236/94; 62/125, 126, 129; 165/11.1
See application file for complete search history.

(56) References Cited

U.S. PATENT DOCUMENTS

| | | | |
|---|---|---|---|
| 2,225,080 A | 12/1940 | Newman | |
| D136,848 S | 12/1943 | Dreyfuss | |
| D136,850 S | 12/1943 | Dreyfuss | |
| D136,852 S | 12/1943 | Dreyfuss | |
| 2,394,920 A | 2/1946 | Kronmiller | |
| D176,657 S | 1/1956 | Dreyfuss | |
| 2,729,719 A | 1/1956 | Kronmiller | |
| D179,069 S | 10/1956 | Dreyfuss | |
| D180,517 S | 6/1957 | Hose | |
| D183,121 S | 7/1958 | Dreyfuss | |
| D183,164 S | 7/1958 | Dreyfuss | |
| D189,368 S | 11/1960 | Baak | |
| D190,050 S | 4/1961 | Duncan | |
| D197,352 S | 1/1964 | Dreyfuss | |
| 3,599,006 A | 8/1971 | Harris | |
| 4,079,366 A | 3/1978 | Wong | |
| D248,838 S | 8/1978 | Pasquarette et al. | |
| 4,174,807 A | 11/1979 | Smith et al. | |
| D254,052 S | 1/1980 | Wolfe | |
| 4,206,872 A | 6/1980 | Levine | |
| 4,223,291 A | 9/1980 | Teichert | |
| 4,252,270 A | 2/1981 | Taylor et al. | |
| 4,264,034 A | 4/1981 | Hyltin et al. | |
| 4,298,946 A | 11/1981 | Hartsell et al. | |
| 4,308,991 A | 1/1982 | Peinetti et al. | |

(Continued)

OTHER PUBLICATIONS

Bourns, ECW—"Digital Contacting Encoder," 3 pages, Apr. 2003.

(Continued)

*Primary Examiner*—Marc E Norman

(57) ABSTRACT

An HVAC controller with a simplified and/or lower cost user interface. In one illustrative embodiment, the HVAC controller includes two switches, a movable member, and a plurality of detents. The detents are configured to cause the two switches to be switched in a sequence when the movable member is moved. In some cases, a controller is coupled to the two switches, and may change an HVAC control parameter based on the switch sequence.

24 Claims, 7 Drawing Sheets

U.S. PATENT DOCUMENTS

| | | | |
|---|---|---|---|
| 4,337,822 | A | 7/1982 | Hyltin et al. |
| 4,382,544 | A | 5/1983 | Stewart |
| 4,386,649 | A | 6/1983 | Hines et al. |
| 4,388,692 | A | 6/1983 | Jones et al. |
| 4,414,520 | A | 11/1983 | Ruuth |
| 4,420,736 | A | 12/1983 | Krueger |
| 4,431,134 | A | 2/1984 | Hendricks et al. |
| 4,442,972 | A | 4/1984 | Sahay et al. |
| 4,446,913 | A | 5/1984 | Krocker |
| 4,449,832 | A | 5/1984 | Kammerer |
| 4,456,169 | A | 6/1984 | Martin |
| 4,479,604 | A | 10/1984 | Didner |
| D276,731 | S | 12/1984 | Steiner |
| 4,582,251 | A * | 4/1986 | Odom et al. ............ 236/94 |
| 4,606,401 | A | 8/1986 | Levine et al. |
| 4,621,336 | A | 11/1986 | Brown |
| D288,670 | S | 3/1987 | Steiner |
| 4,646,964 | A | 3/1987 | Parker et al. |
| 4,653,708 | A | 3/1987 | Rich |
| 4,667,068 | A | 5/1987 | Cummings |
| D290,235 | S | 6/1987 | Odom, Jr. et al. |
| 4,669,654 | A | 6/1987 | Levine et al. |
| 4,685,614 | A | 8/1987 | Levine |
| 4,717,333 | A | 1/1988 | Carignan |
| 4,725,001 | A | 2/1988 | Carney et al. |
| 4,730,110 | A | 3/1988 | Spaulding |
| 4,751,961 | A | 6/1988 | Levine et al. |
| 4,768,706 | A * | 9/1988 | Parfitt ............ 236/94 |
| 4,837,731 | A | 6/1989 | Levine et al. |
| 4,846,400 | A | 7/1989 | Crouse |
| 4,881,686 | A | 11/1989 | Mehta |
| 4,910,503 | A | 3/1990 | Brodsky |
| 4,912,939 | A | 4/1990 | Obermann et al. |
| 4,918,439 | A | 4/1990 | Wozniak et al. |
| 4,948,040 | A | 8/1990 | Kobayashi et al. |
| 4,992,779 | A | 2/1991 | Sugino et al. |
| 4,997,029 | A | 3/1991 | Otsuka et al. |
| 5,005,365 | A | 4/1991 | Lynch |
| 5,012,973 | A | 5/1991 | Dick et al. |
| 5,038,851 | A | 8/1991 | Mehta |
| 5,065,813 | A | 11/1991 | Berkeley et al. |
| 5,088,645 | A | 2/1992 | Bell |
| 5,107,918 | A | 4/1992 | McFarlane et al. |
| 5,148,979 | A | 9/1992 | Brueton |
| 5,154,226 | A | 10/1992 | Porter et al. |
| 5,161,606 | A | 11/1992 | Berkeley et al. |
| 5,181,653 | A | 1/1993 | Foster et al. |
| 5,194,842 | A | 3/1993 | Lau et al. |
| 5,211,332 | A | 5/1993 | Adams |
| 5,230,482 | A | 7/1993 | Ratz et al. |
| 5,246,649 | A | 9/1993 | Mattei et al. |
| 5,251,813 | A | 10/1993 | Kniepkamp |
| 5,259,445 | A | 11/1993 | Pratt et al. |
| 5,303,612 | A | 4/1994 | Odom et al. |
| D347,584 | S | 6/1994 | Vogelpohl |
| 5,329,991 | A | 7/1994 | Mehta et al. |
| 5,348,078 | A | 9/1994 | Dushane et al. |
| 5,482,209 | A | 1/1996 | Cochran et al. |
| 5,526,422 | A | 6/1996 | Keen |
| 5,537,106 | A | 7/1996 | Mitcuhashi |
| 5,542,279 | A | 8/1996 | Erdman et al. |
| 5,566,879 | A | 10/1996 | Longtin |
| 5,570,837 | A | 11/1996 | Brown et al. |
| 5,573,850 | A | 11/1996 | Cunningham et al. |
| 5,673,850 | A | 10/1997 | Uptegraph |
| D390,482 | S | 2/1998 | Pasquarette |
| 5,718,121 | A | 2/1998 | Edwards et al. |
| 5,771,594 | A | 6/1998 | Feichtinger |
| 5,782,296 | A | 7/1998 | Mehta |
| 5,816,491 | A | 10/1998 | Berkeley et al. |
| 5,873,519 | A | 2/1999 | Beilfuss |
| 5,902,183 | A | 5/1999 | D'Souza |
| 5,937,942 | A | 8/1999 | Bias et al. |
| 5,943,917 | A | 8/1999 | Truong et al. |
| 6,032,867 | A | 3/2000 | Dushane et al. |
| 6,196,467 | B1 | 3/2001 | Dushane et al. |
| 6,208,331 | B1 | 3/2001 | Singh et al. |
| 6,315,211 | B1 | 11/2001 | Sartain et al. |
| 6,318,639 | B1 | 11/2001 | Toth |
| 6,351,693 | B1 | 2/2002 | Monie et al. |
| 6,353,429 | B1 | 3/2002 | Long |
| 6,449,533 | B1 | 9/2002 | Mueller et al. |
| 6,502,758 | B2 | 1/2003 | Cottrell |
| 6,518,682 | B2 | 2/2003 | Weaver et al. |
| 6,518,957 | B1 | 2/2003 | Lehtinen et al. |
| 6,525,675 | B2 | 2/2003 | Rodi |
| D471,825 | S | 3/2003 | Peabody |
| 6,542,088 | B1 | 4/2003 | Bielski et al. |
| 6,581,846 | B1 | 6/2003 | Rosen |
| 6,595,430 | B1 | 7/2003 | Shah |
| 6,741,158 | B2 | 5/2004 | Engler et al. |
| 6,927,348 | B1 | 8/2005 | Schmidt et al. |
| 2002/0005435 | A1 | 1/2002 | Cottrell |
| 2002/0063680 | A1 | 5/2002 | Lou et al. |
| 2002/0145544 | A1 | 10/2002 | Rodi |
| 2002/0148317 | A1 | 10/2002 | Onodera |
| 2003/0034897 | A1 | 2/2003 | Shamoon et al. |
| 2003/0034898 | A1 | 2/2003 | Shamoon et al. |
| 2003/0078761 | A1 | 4/2003 | Meyer |
| 2003/0093907 | A1 | 5/2003 | Schroter et al. |
| 2003/0112157 | A1 | 6/2003 | Strasser |
| 2003/0121652 | A1 | 7/2003 | Carey et al. |
| 2003/0142121 | A1 | 7/2003 | Rosen |
| 2003/0209411 | A1 | 11/2003 | McGrath, Jr. et al. |
| 2005/0103877 | A1 * | 5/2005 | DeLuca ............ 236/94 |

OTHER PUBLICATIONS

Braefurn, "Model 3000 Digital Heat/Cool Non-Programmable," 2 pages, printed Dec. 9, 2003, http://www.braebouronline.com/model3000.htm.

Carrier, "Programmable Dual Fuel Thermostat," Installation, Start-Up & Operating Instructions, pp. 1-12, Oct. 1998.

Carrier, "Programmable Thermostats," Installation, Start-Up & Operating Instructions, pp. 1-16, Sep. 1998.

Carrier, "Standard Programmable Thermostat," Homeowner's Manual, pp. 1-8, pages, 1998.

Carrier, "Thermidistat Control," Installation, Start-Up, and Operating Instructions, pp. 1-12, Aug. 1999.

CorAccess, "Companion 6," User Guide, pp. 1-20, Jun. 17, 2002.

Eco-Stat Website, http://www.ecomfg.net, 4 pages, printed Sep. 30, 2003 and Oct. 1, 2003.

http://www.thermostatsales.com, Robertshaw, "9610 Digital Programmable Thermostat," 3 pages, printed Jun. 17, 2004.

http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

Hunter, "44200/44250," Owner's Manual, 32 pages, printed prior to filing date.

Hunter, "44300/44350," Owner's Manual, 35 pages, printed prior to filing date.

Hunter, "Auto Saver 550", Owner's Manual Model 44550, 44 pages, printed prior to filing date.

Invensys™, "9700i 9701i 9715i 9720i Deluxe Programmable Thermostats," User's Manual, pp. 1-28, printed prior to filing date.

Lux, "511 Series Smart Temp Electronic Thermostat," Owner's Manual, 3 pages, printed prior to filing date.

Lux, "600 Series Smart Temp Electronic Thermostat," Owner's Manual, 3 pages, printed prior to filing date.

Lux, "602 Series Multi-Stage Programmable Thermostat," Owner's Manual, 2 pages, printed prior to filing date.

Lux, "605/2110 Series Programmable Heat Pump Thermostat," Owner's Manual, 3 pages, printed prior to filing date.
Lux, "700/9000 Series Smart Temp Electronic Thermostat," Owner's Manual, 3 pages, printed prior to filing date.
Lux, "PSPH521 Series Programmable Heat Pump Thermostat," Owner's Manual, 3 pages, printed prior to filing date.
Lux, TX500: Smart Temp 500, 2 pages, printed Dec. 9, 2003, http://wwww.luxproducts.com/thermostats/tx500.htm.
Lux, "TX1500 Series Smart Temp Electronic Thermostat," Owner's Manual, 6 pages, printed prior to filing date.
Lux, "TX500 Series Smart Temp Electronic Thermostat," Owner's Manual, 3 pages, printed prior to filing date.
Lux, "ELV1 Programmable Line Voltage Thermostat," Owner's Manual, 3 pages, printed prior to filing date.
METASYS, "HVAC PRO for Windows User's Manual," 308 pages, 1998.
Millier, "Using Rotary Encoders as Input Devices," Circuit Cellular, Issue 152, 6 pages, Mar. 2003.
http://www.ritetemp.info/rtMenu_13.html, Rite Temp 8082, 8 pages, printed Jun. 20, 2003.
RE16 Series Mechanical Incremental Rotary Encoder, 3 pages, prior to filing date.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Warmly Yours, "Model TH111GFCI-P (120 VAC)," Manual, pp. 1-4, printed prior to filing date.
White-Rodgers, "Installation Instructions for Heating & Air Conditioning IF72 ⅝ Day Programmable Heat Pump Thermostats," 8 pages, printed prior to filing date.
White-Rodgers, "Installation Instructions for Heating & Air Conditioning IF78 ⅝ Day Programmable Heat Pump Thermostats," 7 pages, printed prior to filing date.
White-Rodgers, "Comfort-Set 90 Series Thermostat," Maual, pp. 1-24, printed prior to filing date.
White-Rodgers, "Comfort-Set III Thermostat," Maual, pp. 1-44, printed prior to filing date.
White-Rodgers, 1F80-240 "(for Heating Only systems) Programmable Electronic Digital Thermostat," Installation and Operation Instructions, 8 pages, printed prior to filing date.
White-Rodgers, 1F80-241 "Programmable Electronic Digital Thermostat," Installation and Operational Instructions, 6 pages, printed prior to filing date.
White-Rodgers, 1F80-261 "Programmable Electronic Digital Thermostat," Installation and Operational Instructions, 8 pages, printed prior to filing date.
White-Rodgers, 1F81-261 "Programmable Electronic Digital Multi-Stage Thermostat," Installation and Operational Instructions, 8 pages, printed prior to filing date.
White-Rodgers, 1F82-261 "Programmable Electronic Digital Heat Pump Thermostat," Installation and Operational Instructions, 8 pages, printed prior to filing date.
www.icmcontrols.com, Simplecomfort, SC3000 Single Stage Heat/Single Stage Cool or Single Stage Heat Pump/Manual Changeover, 1 page, printed prior to filing date.
www.icmcontrols.com, Simplecomfort, SC3001 Single Stage Heat/Single Stage Cool or Single Stage Heat Pump/Manual Changeover, 1 page, printed prior to filing date.
www.icmcontrols.com, Simplecomfort, SC3006 Single Stage Heat/Single Stage Cool or Single Stage Heat Pump/Manual Changeover, 1 page, printed prior to filing date.
www.icmcontrols.com, Simplecomfort, SC3201 2 Stage Heat Pump Manual Changeover, 1 page, printed prior to filing date.
www.icmcontrols.com, Simplecomfort, SC3801 2 Stage Heat/2 Stage Cool 2 Stage Heat Pump/Audio Changeover, 1 page, printed prior to filing date.
Honeywell, "Thermostat Subbases Q539A,B,C,F,G,H,J,P," pp. 1-11, 1989.
Honeywell, "T87F Thermostats," pp. 1-8, 2002.
Honeywell, "Electromechanical Thermostats," 2 pages, 2002.
Honeywell, "Modulating Room Thermostat," Dutch User's Manual and English translation of the manual, 13 pages each, Mar. 2002.
Carrier, "Thermostats: Carrier HVAC Parts," 52 pages, printed Oct. 14, 2003, http://www.carrierhvacparts.com/Merchant2/merchant.mv.
Honeywell, "T8141A Electronic Heat Pump Thermostat," Installation Instructions, 8 pages, 1995.
Honeywell, "T8141A Electronic Heat Pump Thermostats," Product Data, 8 pages, 1996.
Honeywell, "T8200 Microelectronic Fuel Saver Thermostat," Owner's Manual, 23 pages, 1984.
Honeywell, "T8200A Microelectronic Chronotherm Fuel Saver Thermostat," 20 pages, 1986.
Ritetemp, "Install Guide 8095," 7 pages, prior to Jun. 22, 2004.
Ritetemp, "Install Guide 8099," 8 pages, prior to Jun. 22, 2004.
Ritetemp, "The RiteTemp Support Site—8099 Technical Support Page," 1 page, printed Oct. 14, 2003, http:///www.ritetemp-thermostats.com/8099.html.
Ritetemp, "The RiteTemp Support Site—What Thermostat," 1 page, printed Oct. 14, 2003, http://www.ritetemp-thermostats.com/What_Thermostat.html.
www.honeywell.com/yourhome/, "Comfort Energy and Health Solutions," Honeywell website, 2 pages, 2002.

* cited by examiner

HVAC CONTROLLER

This application is a continuation of U.S. patent application Ser. No. 10/791,043 filed Mar. 1, 2004.

FIELD OF THE INVENTION

The present invention relates generally to the field of controllers, and more particularly to HVAC controllers for controlling one or more environmental conditions of an inside space.

BACKGROUND OF THE INVENTION

Controllers are used on a wide variety of devices and systems for controlling various functions in homes and/or buildings and their related grounds. Some controllers have schedule programming that modifies device parameter set points as a function of date and/or time. HVAC controllers, for example, are employed to monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modern thermostats for use in the home, a controller unit equipped with temperature, humidity and/or other sensing capabilities may be provided to interact with a heater, blower, flue vent, air compressor, humidifier and/or other components, to control the temperature, humidity, and/or other environmental conditions at various locations within the home. For example, a sensor located within the controller unit and/or at one or more remote locations may be employed to sense when the temperature or humidity reaches a certain threshold level, causing the controller unit to send a signal to activate or deactivate one or more component in the system.

The controller may be equipped with an interface that allows the user to monitor and adjust the environmental conditions at one or more locations within the building. With more modern designs, the interface typically includes a liquid crystal display (LCD) panel inset within a housing that contains the microprocessor as well as other components of the controller. In some designs, the interface may permit the user to program the controller to activate on a certain schedule determined by the user. For example, the interface may include a separate menu routine that permits the user to change the temperature at one or more times during a particular day. Once the settings for that day have been programmed, the user can then repeat the process to change the settings for the other remaining days.

Many of these controllers have one or more push buttons located on the front of the controller. A microcontroller or the like typically receives and interprets the signals from the push buttons, and implements the desired function. It has been found, however, that some users have difficulty controlling and/or programming their controllers using such pushbuttons, particularly those users that are not familiar with modern computers and/or computer interfaces. In addition, push buttons and the supporting hardware and/or software can significant increase the cost of such controllers. As such, it would be desirable to provide a simplified and/or lower cost controller interface for an HVAC controller.

SUMMARY OF THE INVENTION

The present invention is directed at an HVAC controller with a simplified and/or lower cost user interface. In one illustrative embodiment, the HVAC controller includes two switches, a movable member, and a plurality of detents. The detents are configured to cause the two switches to be switched in a sequence when the movable member is moved. In some cases, a controller is coupled to the two switches, and may change an HVAC control parameter based on the switch sequence.

In some embodiments, the detents may be provided on the movable member, and a number of detent tabs may ride along the detents as the movable member is moved. The detent tabs may activate and deactivate the switches, depending on whether the detent tabs lie along a peak or valley of the detents. When more than one detent tab is provided, the detents and detent tabs may be configured such that the two switches are switched out of phase relative to one another. When so provided, both the direction and magnitude of movement of the moveable member can be detected. In some embodiments, and for detecting rotational movement, the detents are may be provided along a detent ring.

In some embodiments, more than one set of detents may be provided. For example, a first set of detents may be used to cause the two switches to be switched in a sequence when the movable member is moved. A second set of detents may also be provided to fix the position of the movable member at one of a series or positions. In effect, the second set of detents may be used to provide discrete stopping positions for the movable member. The discrete stopping positions may correspond to discrete "states" of the switches as the movable member moves across the first set of detents.

In some embodiments, the HVAC controller includes a backlight button. The backlight button may be a hinged button on a front surface of the HVAC controller, and may form a portion of an HVAC controller outer housing. The backlight button can have a surface area greater than or equal to a surface area of a display on the HVAC controller. Alternatively, or in addition to, the backlight button can have a surface area at least 2.5% of an HVAC controller outer housing cross-sectional surface area. Also described is an HVAC controller that includes a zebra strip for electrically connecting a backlight light source to a circuit board. Also described is an HVAC controller that includes a sensor circuit board that intersects and/or interlocks with a main circuit board.

In further embodiment, An HVAC controller includes a controller housing having a front surface, a display on the front surface, and an movable interface member disposed about the display and forming a portion of the controller housing front surface, wherein the movable member is movable relative to the display.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

As used herein, the term "control parameter" may include any parameter or setting useful when operating an HVAC controller such as, for example, a temperature control setting, a humidity control setting, a time control setting, an actual temperature reading, an actual time reading, an actual humidity reading, a schedule parameter, and/or the like.

Figure 1:
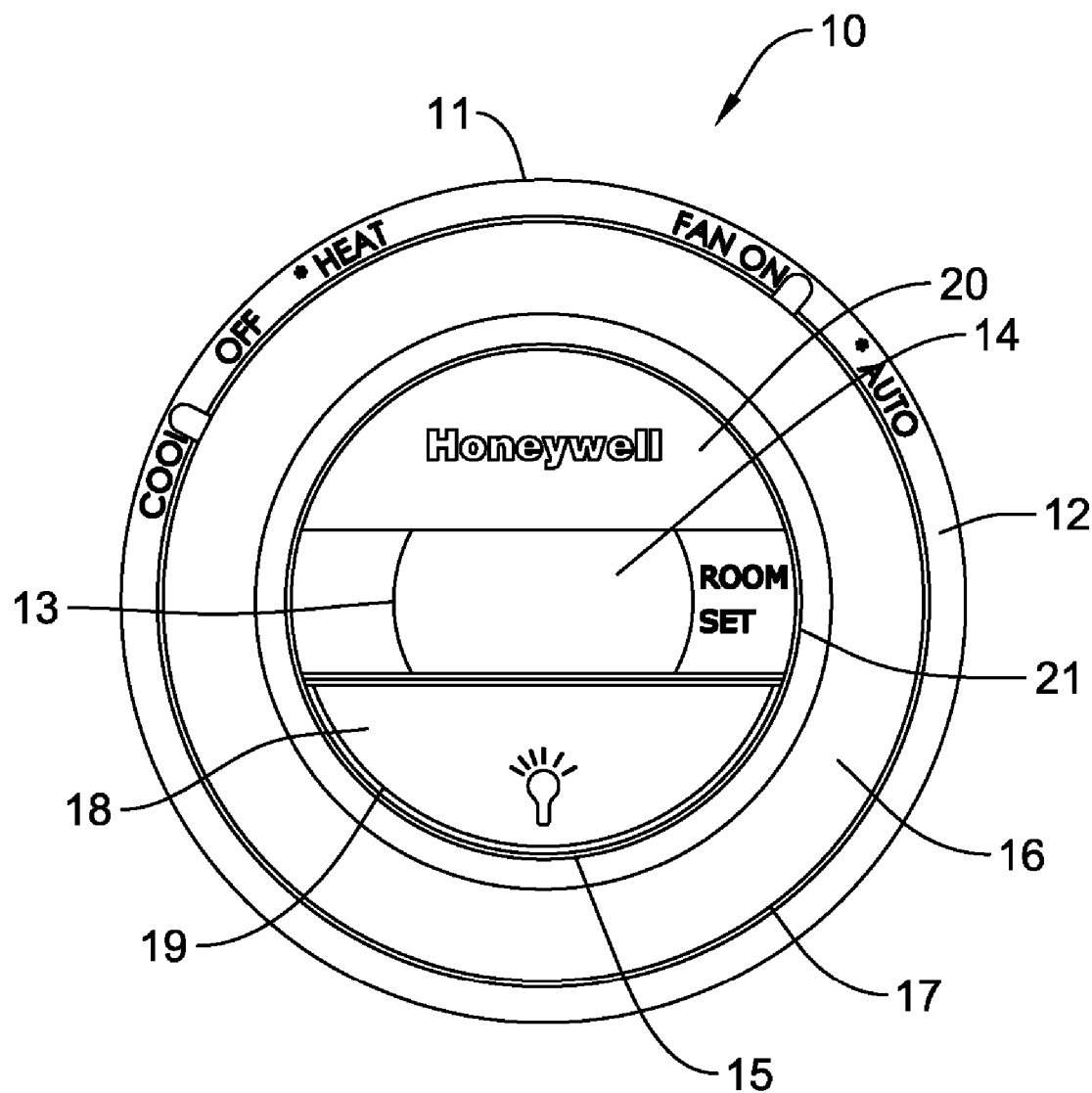
FIG. 1 is a front view of an illustrative controller employing various aspects of the present invention.

FIG. 1 is a front view of an illustrative controller 10 employing various aspects of the present invention. Controller 10, illustratively a wall-mounted thermostat, includes a base housing 12, a front surface 20 including a display or interface (i.e., LCD) panel 14, and an interface or control member 16. In an illustrative embodiment, the display panel 14 and a backlight button 18 form a portion of the front surface 20. The backlight button 18 is shown adjacent and below the display panel 14, however the backlight button 18 and display panel 14 can be located in any useable location and assume any suitable configuration relative to one another, as desired. The base housing 12, front surface 20 and interface member 16 form an outer housing for the controller 10. The controller 10 is shown having a circular form, however, the controller 10 can have any useable regular or irregular form such as, for example, square, rectangle, oblong, triangular, or any other form, as desired.

The base housing 12 is defined by a base housing perimeter 11. In an illustrative embodiment, the base housing 12 is adjacent to a mounting surface (not shown). The base housing 12 has a base housing surface area defined by the base housing perimeter 11. As used herein, the term "surface area" is defined as a planar cross-sectional surface area. In some embodiments, the surface area of the base housing 12 can be from 1 in$^2$ to 40 in$^2$, or 5 in$^2$ to 20 in$^2$, or 7 in$^2$ to 15 in$^2$, as desired. However, it should be recognized that the surface area of the base housing 12 can have any desired size.

The front surface 20 of the controller 10 is defined by a front surface perimeter 21. In the illustrative embodiment, the front surface 20 is shown having a circular shape, however, the front surface 20 can have any useable regular or irregular shape such as, for example, square, rectangle, oblong, or triangular. The front surface 20 can have a generally planar or non-planar surface. In an illustrative embodiment, the front surface 20 has a generally planar or generally convex surface. In the illustrative embodiment, the front surface 20 is located generally at the center of the controller 10, however, the front surface can be located at any useable position on the controller 10.

In the illustrative embodiment, the display panel 14 is defined by a display panel perimeter 13. The display panel 14 can have any useable regular or irregular shape, as desired. The display panel 14 has a display panel surface area within the display panel perimeter 13. In some embodiments, the surface area of the display panel 14 can be from 0.25 in$^2$ to 5 in$^2$, or 0.5 in$^2$ to 2 in$^2$, or 0.75 in$^2$ to 1 in$^2$, as desired. However, it should be recognized that the surface area of the display panel 14 can have any desired size.

A separate display retainer and switchable backlight (see FIG. 7) disposed behind the display panel 14 may be used to illuminate the display panel 14 at night, and to increase the visibility of the display panel 14 during daytime use. A backlight button 18 may be used to operably activate and/or deactivate the switchable backlight. Alternatively, or in addition, the switchable backlight can be activated by moving the interface member 16 when displaying and/or adjusting a display parameter. The switchable backlight can deactivate following the expiration of a specific time interval.

The backlight button 18 is defined by a backlight button perimeter 19. The backlight button 18 can have any useable regular or irregular shape, as desired. The backlight button 18 has a backlight button surface area within the backlight button perimeter 19. In some embodiments, the surface area of the backlight button 18 can be from 0.25 in$^2$ to 5 in$^2$, or 0.5 in$^2$ to 2 in$^2$, or 0.75 in$^2$ to 1 in$^2$, as desired. However, it should be recognized that the surface area of the backlight button 18 can have any desired size. In an illustrative embodiment, the backlight button 18 has a surface area that is greater than or equal to the display panel 14 surface area. In some illustrative embodiments, the backlight button 18 has a surface area 10% greater, 20% greater, 30% greater or more than the display panel 14 surface area. In further illustrative embodiments, the backlight button 18 has a surface area of at least 1%, 2.5%, 5%, 7.5%, 10%, 12.5%, 15% or more of the base housing 12 surface area.

The backlight button 18 can be generally co-planar with the controller outer housing or front surface 20 and form a portion of the outer housing or front surface 20. In some embodiments, the backlight button 18 is hinged to a portion of the controller 10 outer housing or front surface 20, if desired. In an illustrative embodiment, the backlight button 18 is hinged to the front surface 20 and forms a portion of the front surface 20 and outer housing. The backlight button can be hinged adjacent to the display panel 14, for example.

The interface member 16 is shown having an annular shape, however, the interface member 16 can have any useable regular or irregular shape as desired. In the illustrative embodiment, the interface member 16 forms the portion of the outer housing between the base housing 12 and the front surface 20. The interface member 16 is defined by an interface inner perimeter 15 between the front surface 20 and the interface member 16, and an interface outer perimeter 17 between the interface member 16 and the base housing. In the illustrative embodiment, the interface member 16 can be rotated in a clockwise and/or counter-clockwise manner.

The interface member 16 is configured to modify the information displayed on the display panel 14. For example, and in one illustrative embodiment, the interface member 16 may display the value of a parameter of the controller 10, such as time, temperature, one or more set points, or any other suitable parameter. The interface member 16 can then be rotated to effect a change in the parameter on the display panel 14. In another illustrative embodiment, the display panel 14 can initially display information regarding a first parameter such as, for example, a time or a temperature. Upon movement of the interface member 16, the display panel 14 can display information regarding a second parameter such as, for example, a time or temperature set point. The interface member 16 can then be further moved to effect a change in the second parameter. For example, the interface member can be moved in a first direction to increase the value of the displayed second parameter or be moved in a second direction opposite the first direction to decrease the value of the displayed second parameter. In an illustrative embodiment, the interface member 16 has an annular or circular form and the movement is a rotational movement. However, in other embodiments, the interface member may be moved along an elliptical, linear or along any other desired path, as desired.

The interface member 16 can be removable from the controller 10, if desired. Removal of the interface member 16 by a user aids in cleaning the controller 10 and interface member 16. In addition, with the interface member 16 removed the controller 10 still can fulfill all the requirements for environmental protection such as static discharges. The interface member 16 can be formed of a rigid thermoplastic material. The interface member 16 can be formed from a same material as the material forming the controller housing 10 and/or base housing 12 and/or front surface 20. The interface member 16 can have a smooth surface.

Figure 2:
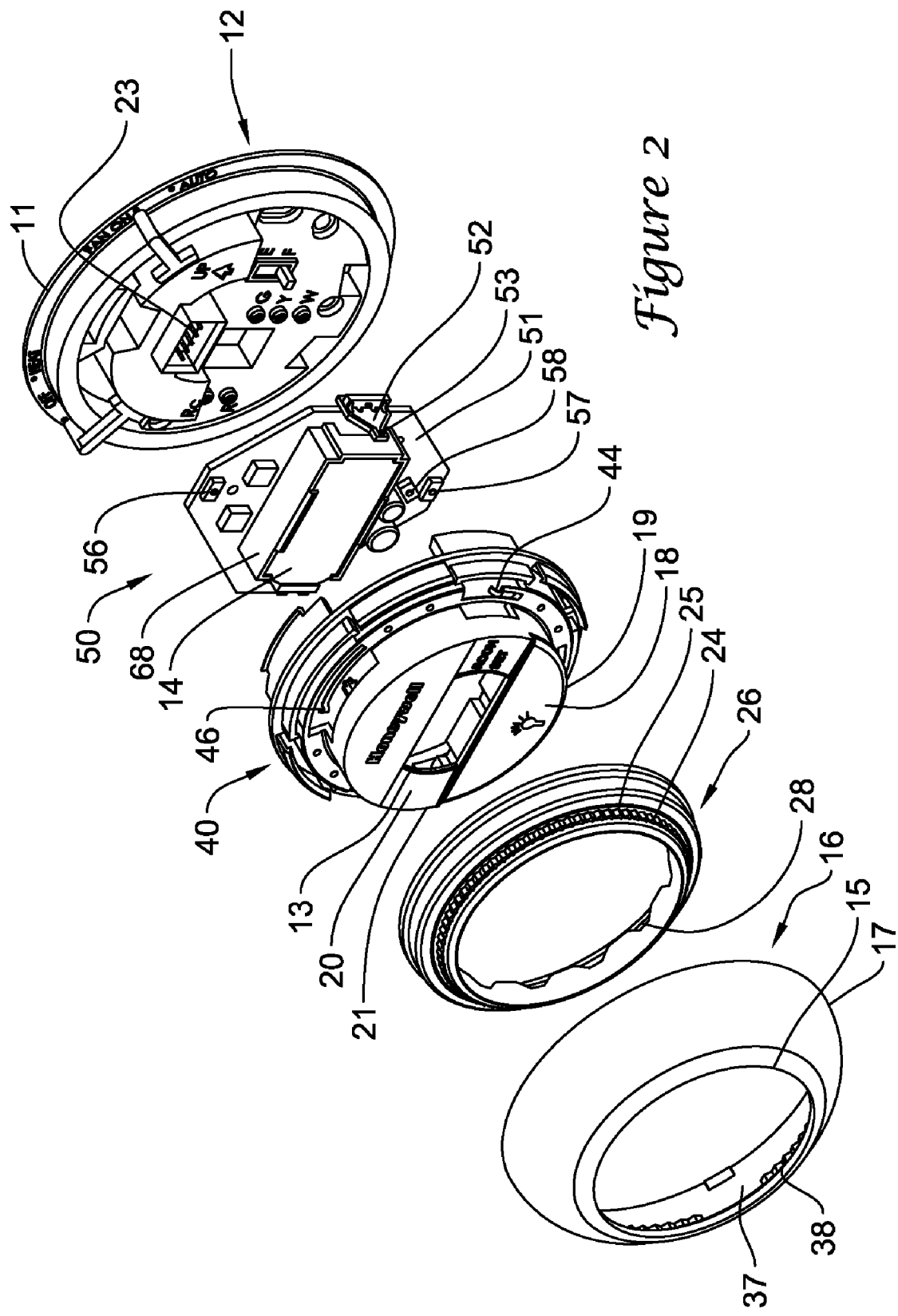
FIG. 2 is an exploded perspective view of the illustrative controller of FIG. 1.

FIG. 2 is an exploded perspective view of the illustrative controller 10 shown in FIG. 1. A base housing 12 may be provided. The base housing 12 may be mounted to a mounting surface such as a wall. A controller section, which is generally shown at 50, is disposed on or adjacent to the base housing 12, and in some embodiments, a connector 23 may provide one or more signal connections between the base housing 12 and the controller section 50.

The controller section 50 can include electronics useful for the operation of the controller 10. In an illustrative embodiment, the controller section 50 includes a main circuit board 51. A display panel 14 may be attached to the main circuit board 51 via a display retainer housing 68, as further described below. Two switches 56 and 57 can also be disposed on or adjacent to the main circuit board 51. The two switches 56 and 57 may be electrically connected to electronics on the main circuit board 51, and may form the basis for adjusting one or more control parameters of the controller 10. More than two stitches can be used, if desired. The switches 56 and 57 can be mechanical switches, optical switches, or any other suitable switches, as desired. The control of switches 56 and 57 is described further below. A backlight switch 58 can also be disposed on or adjacent to the main circuit board 51. The backlight switch 58 can be mechanically coupled to backlight button 18 through a backlight button post 48 (see FIG. 5). The backlight switch 58 may be used to operably activate and/or deactivate the switchable backlight of the display panel 14.

A sensor 53, such as a temperature sensor, a humidity sensor, a gas sensor, or the like, may also be electrically coupled to the main circuit board 51. The sensor 53 is shown spaced away from the main circuit board 51, which in some cases, may be helpful in achieving a more accurate reading. The sensor 53 is disposed on a sensor circuit board 52, which as better shown in FIG. 6, intersects and/or interlocks with the main circuit board 51.

An intermediate housing 40 is disposed on or adjacent to the controller section 50. The intermediate housing 40 can form at least part of the front surface 20 of the controller 10. In the illustrative embodiment, the intermediate housing 40 includes a display aperture defined by display perimeter 13. The display aperture may allow a user to see the display panel 14 of the controller section 50. A backlight button 18 forms a portion of the intermediate housing 40 and/or front surface 20. In the illustrative embodiment, the backlight button 18 can be attached to the intermediate housing 40 via a hinge.

The intermediate housing may also include one or more detent tabs (e.g. 44, 46). The detent tabs 44 and 46 can be formed from metal or any other suitable material. The detent tabs 44 and 46 can be configured to engage corresponding outer and inner detent rings, respectively, of a detent ring housing 26 (see FIG. 4 below). The detent tabs 44 and 46 may move toward the back base housing 12 when engaging a peak of a detent along the detent ring housing, and away from the back housing 12 when engaging a valley of a detent along the detent ring housing.

Detent tab 44 may perform a different function than detent tab 46. For example, detent tab 44 may be used to selectively fix the position of the detent ring housing 26 at defined incremental positions. In contrast, detent tab 46 may be used to selectively activate switch 56, based on the current incremental position of the detent ring housing 26.

The detent ring housing 26 is disposed on or adjacent to the intermediate housing 40. As better shown in FIG. 5, the detent ring housing 26 may include an inner detent ring 28 and an outer detent ring 29 both facing the intermediate housing 40. The inner detent ring 28 is adapted to engage detent tab 46 of the intermediate housing 40. The outer detent ring 29 is adapted to engage detent tab 44 of the intermediate housing 40.

The detent ring housing 26 also includes an interlock surface 24. The interlock surface 24 is configured to engage an interface member 16, and couple the detent ring housing 26 to the interface member 16. In the illustrative embodiment, the interlock surface 24 is a grooved surface with the interface member 16 having a corresponding grooved mating surface 38.

The interface member 16 can form a portion of the outer housing of the controller 10. The interface member 16 can have an interface inner perimeter 15 and an interface outer perimeter 17. The grooved mating surface 38 can be disposed on or in the inner surface 37 of the interface member 16, and may be adapted to engage the interlock surface 24 of the detent ring housing 26. The interface member 16 can be rotated by a user of the controller 10. When rotated, the interface member 16 moves the detent ring housing 26 relative to the detent tabs 44 and 46 of the intermediate housing 40. Detent tab 44 may selectively fix the position of the detent ring housing 26 and thus the interface member 16 at defined incremental positions. Detent tab 46 may be used to selectively activate switch 56, based on the current incremental position of the interface member 16.

Figure 3:
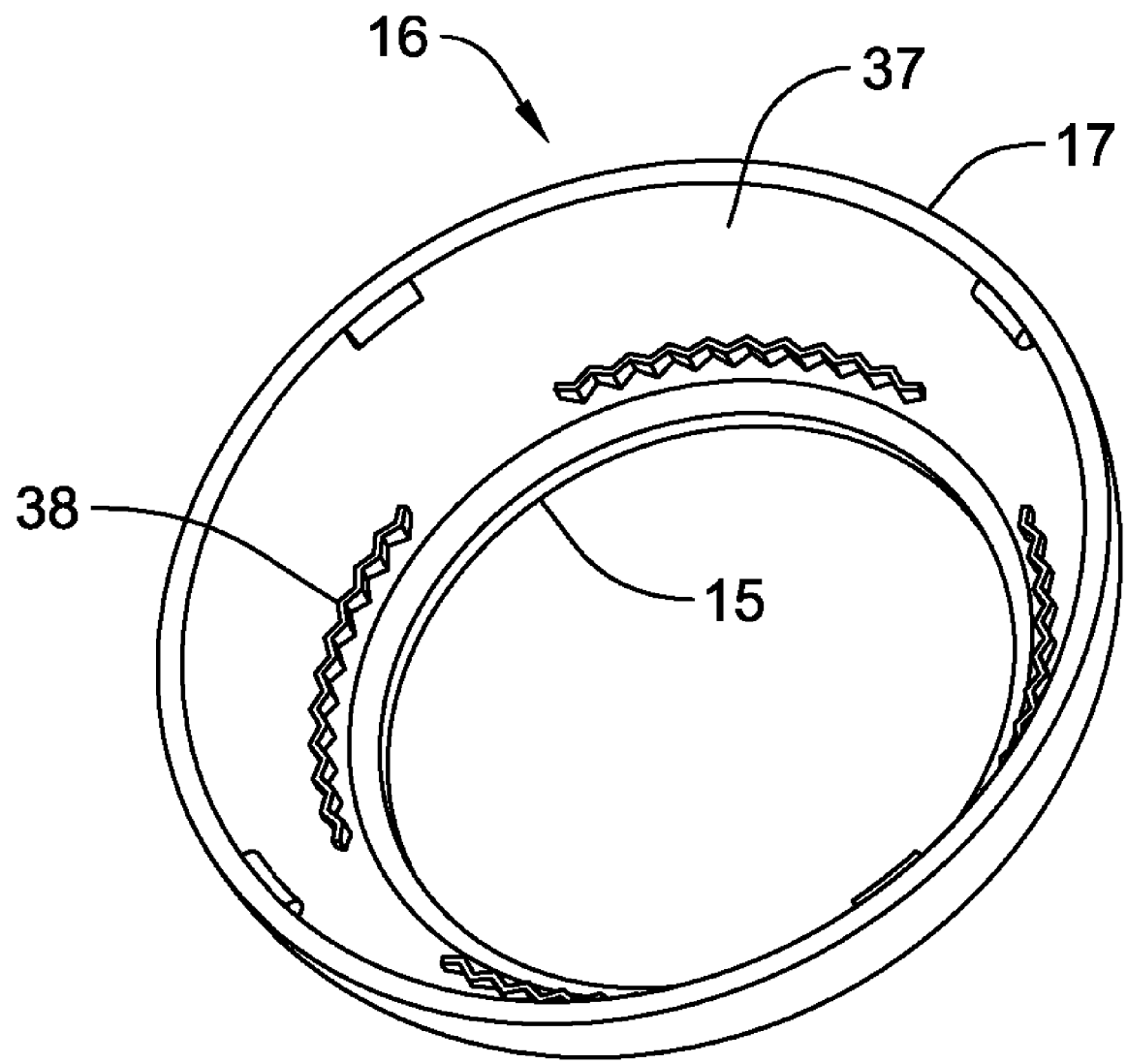
FIG. 3 is a perspective view of an illustrative interface member showing an illustrative inner surface.

FIG. 3 is a perspective view of an illustrative interface member 16 showing inner surface 37. The grooved mating surface 38 may include four separate grooved mating surfaces 38. The four separate grooved mating surfaces 38 may be configured to engage a different part of the interlock surface 24 of the detent ring housing 26. In the illustrative embodiment, the interface member 16 has an annular and concave shape as shown.

Figure 4:
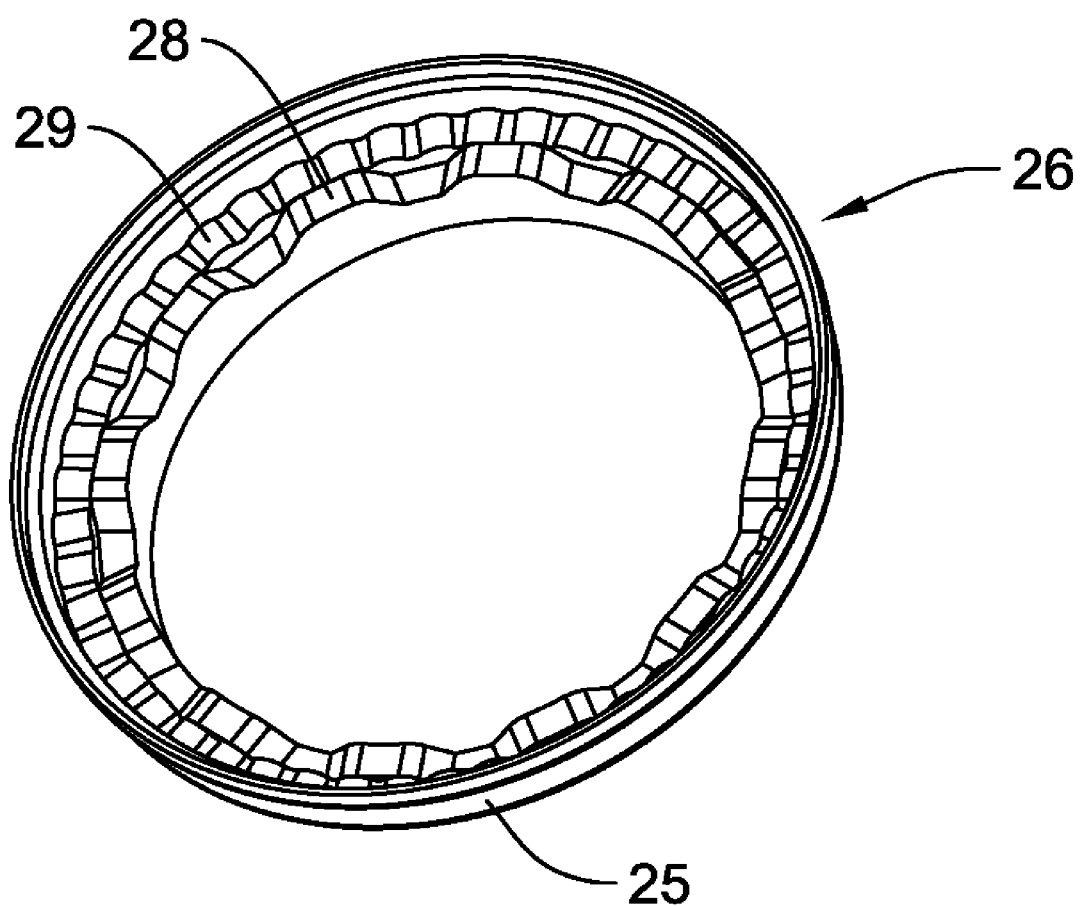
FIG. 4 is a perspective view of an illustrative detent ring showing an illustrative inner surface.

FIG. 4 is a perspective view of an illustrative detent ring housing 26 having an inner detent ring 28 and an outer detent ring 29. The inner detent ring 28 has a first detent pattern and the outer detent ring 29 has a second detent pattern. The inner detent ring pattern is used move detent tabs 46a and 46b of the intermediate housing 40 toward and away from the main control board 51. As the detent tabs 46a and 46b move toward and away from the main control board, they each activate and/or deactivate the corresponding switches 56 and 57. By noting the sequence of activation of the switches 56 and 57, the controller 10 can determine the direction and magnitude of movement of the interface member 16. The outer detent ring 29 pattern can work in cooperation with detent tabs 44a and 44b of the intermediate housing 40 to selectively fix the position of the interface member 16 at defined incremental positions. The outer detent ring pattern may work in cooperation with the inner detent ring pattern so that the defined incremental positions correspond to desired locations or "states" along the inner detent ring pattern.

Figure 5:
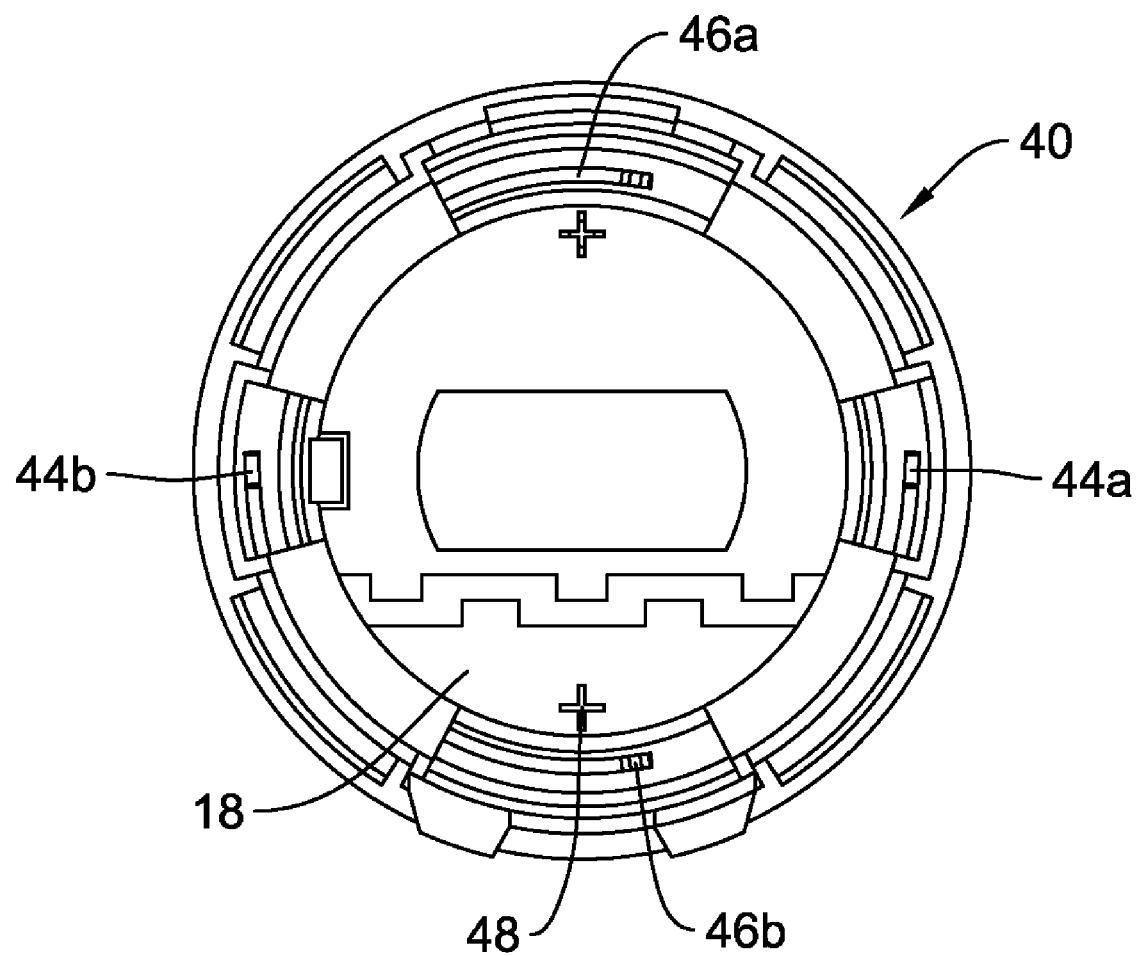
FIG. 5 is a rear view of an illustrative intermediate housing.

FIG. 5 is a rear view of an illustrative intermediate housing 40. A set of outer resilient detent tabs 44a, 44b are shown generally at a three o'clock and a nine o'clock position on the intermediate housing 40. The outer resilient detent tabs 44a and 44b are adapted to engage and ride over the outer detent ring 29 of FIG. 4, and selectively fix the position of the interface member 16 at defined incremental locations when the outer resilient detent tabs 44a and 44b come to rest between two detents.

A set of inner resilient detent tabs 46a, 46b are also shown, generally at a twelve o'clock and a six o'clock position on the intermediate housing 40. In an illustrative embodiment, a first inner resilient detent tab 46a and second inner resilient detent tab 46b are positioned relative to one another such that they operate out of phase while riding over the inner detent ring 28. In this configuration, the first inner resilient detent tab 46a and second inner resilient detent tab 46b can operate to indicate both direction and magnitude of movement of the detent ring 26 relative to the intermediate housing 40.

For example, the inner resilient detent tabs 46a, 46b can be about 90 degrees out of phase relative to detents of the inner detent ring 28. Also, the outer detent ring 29 may be configured relative to the inner detent ring 28 to provide four selective stopping states for each period of the inner detent ring pattern such that the inner resilient detent tabs 46a, 46b can obtain four sequential states (first tab:second tab) when rotated in a clockwise manner. These four sequential states may be, for example: off:off, off:on, on:on, and on:off (where "on" indicated tab deflection and "off" indicates no tab deflection). When rotated in a counter-clockwise manner, the sequence of states may be: off:off, on:off, on:on, off:on. Thus, the state of the switches 56 and 57 on the main circuit board 51 can be used to determine the direction and magnitude of rotation of the interface member 16, and in some cases, to adjust a parameter accordingly.

FIG. 5 also shows a backlight button post 48 extending away from the backlight button 18. In the illustrative embodiment, the backlight button post 48 engages the backlight switch 58 (see FIG. 2) on the main circuit board 51.

Figure 6:
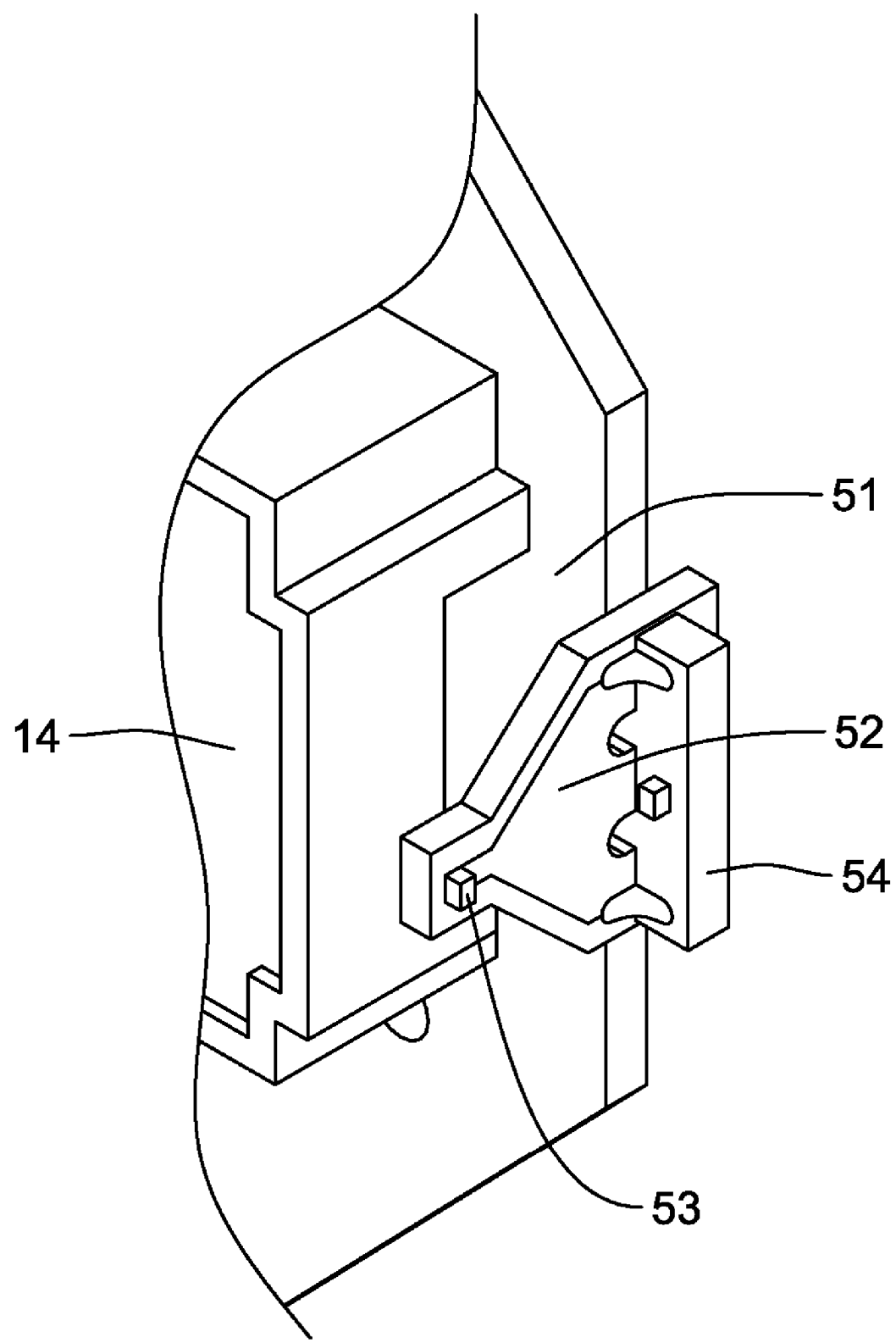
FIG. 6 is a perspective view of an illustrative sensor assembly in accordance with an illustrative embodiment of the present invention.

FIG. 6 is a perspective view of an illustrative sensor 53 in accordance with an illustrative embodiment of the present invention. In the illustrative embodiment, a sensor 53 is provided, but is spaced away from the main circuit board 51. The sensor 53 can be any sensor such as, for example, a temperature sensor, a humidity sensor, a gas sensor, or the like. To space the sensor away from the main circuit board 51, the sensor 53 can be disposed on a sensor circuit board 52. The main circuit board 51 can extend along a first plane, and the sensor circuit board 52 can extend along a second plane that intersects the first plane. In the illustrative embodiment, the sensor circuit board 52 intersects and/or interlocks with the main circuit board 51. The main circuit board includes a protrusion 54 that extends away from the main circuit board 51. The sensor circuit board 52 is adapted to extend around the protrusion 54 and sometimes interlock therewith. In some embodiments, the protrusion 54 may form one or more slots between the protrusion and the main circuit board. The sensor circuit board 52 may then be configured to slip into the one or more slots to engage and sometimes interlock therewith.

The sensor circuit board 52 may include one or more signal traces to provide electrical signals to/from the sensor. The one or more signal traces can be electrically connected to corresponding signal traces on the main circuit board with solder or the like, as shown. While only one sensor 53 is shown, it is contemplated that more than one sensor may be provided on the sensor circuit board 52, if desired.

Figure 7:
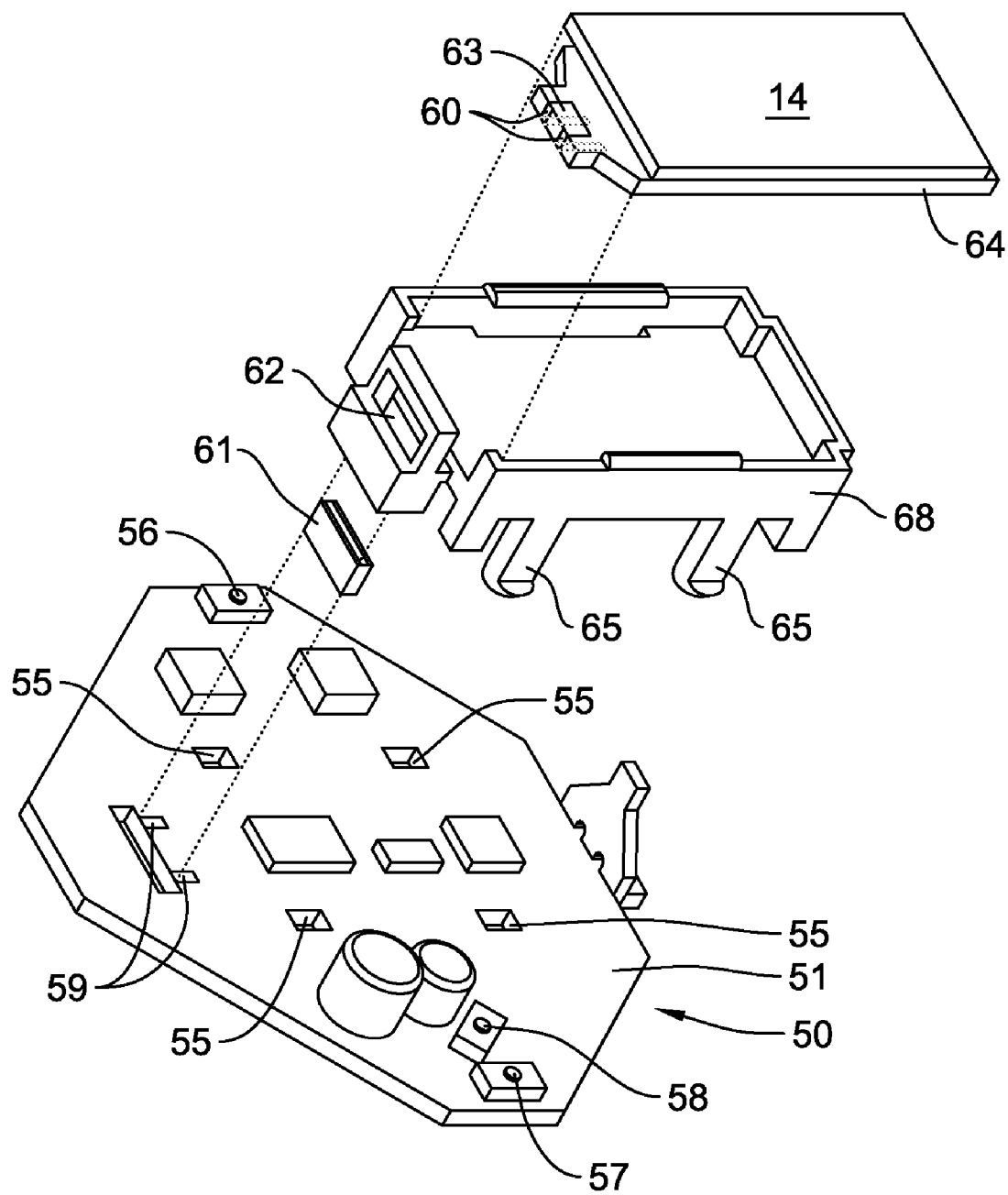
FIG. 7 is an exploded view of a backlight assembly.

FIG. 7 is an exploded view of a backlight assembly. The illustrative backlight assembly includes a display retainer housing 68. The display retainer housing 68 is configured to support and retain a display panel 14, such as an LCD display panel. The display retainer housing 68 may include one or more support legs 65 that are configured to engage a corresponding set of notches or holes 55 in the main circuit board 51. However, this is not required in all embodiments.

The display panel 14 can include a light guide plate 64, if desired. The light guide plate 64 may help distribute light across the display panel 14 from one or more light sources 63. The one or more light sources 63 may include any suitable light source, such as a light emitting diode (LEDs). The light guide plate 64 and one or more light sources 63 may be formed as a single unit using, for example, an injection molding process. Alternatively, the light guide plate 64 and one or more light sources 63 may be formed as separate elements and then connected together by adhesive or other suitable bonding process. The light guide plate 64 may be formed of any suitable transparent material including, for example, polycarbonate, acrylic, styrene acrylonitrile thermoplastic, acrylonitrile butadiene styrene (ABS), etc.

The dimensions of the light guide plate 64 can also be selected to control the uniformity and brightness of light rays as they pass across the backside of the display panel 14. In certain embodiments, for example, the thickness of the light guide plate 64 can be varied to adjust the amount or orientation of light rays reflected towards the backside of the display panel 14 in order to provide greater or less illumination to particular locations of the display panel 14.

The retainer housing 68 may have a slot 62 that is configured to receive an elastomeric zebra-strip 61. The one or more light sources 63 can have one or more light source leads 60 that extend into the slot 62. In the illustrative embodiment, the one or more light source leads 60 extend along the bottom surface of the light guide plate 64 to engage the zebra-strip 61. The zebra-strip 61 electrically connects the light source leads 60 that extend into the slot 62 to leads 59 on the surface of the main circuit board 51. The zebra-strip 61 may include several electrically conductive filaments therein that contact the circuit board leads 59 and light source leads 60 when compressed within the slot 62. In certain embodiments, the slot 62 can be dimensioned to tightly receive the elastomeric zebra-strip 61, but this is not required in all embodiments.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. An HVAC controller, comprising:
   a controller housing having a front face with a central region;
   a display in the central region of the front face of the controller housing; and
   a movable interface member disposed around at least part of the central region of the front face of the controller housing and forming part of the front face of the controller housing, the movable interface member adapted to move relative to the central region of the front face of the controller housing;

wherein a value of a first parameter of the controller is initially displayed on the display, and motion of the movable interface member causes a value of a second parameter to be displayed on the display, replacing the display of the value of the first parameter.

2. The HVAC controller according to claim 1, wherein the movable interface member is annular in shape and extends around the central region of the front face of the controller housing.

3. The HVAC controller according to claim 1, wherein the movable interface member is rotatable about the display.

4. The HVAC controller according to claim 3, wherein the movable interface member is rotatable in both a clockwise and a counter-clockwise direction.

5. The HVAC controller according to claim 1, wherein the second parameter is a set point of the HVAC controller, and motion of the movable interface member modifies the set point shown on the display.

6. The HVAC controller according to claim 1, wherein the value of the first parameter of the controller is an actual temperature reading, and the second parameter is a set point of the HVAC controller.

7. The HVAC controller according to claim 1, wherein continued motion of the movable interface member causes the value of the displayed second parameter to be changed.

8. The HVAC controller according to claim 1, wherein the movable interface member is removable from the HVAC controller.

9. The HVAC controller according to claim 1, wherein the movable interface member is movable over a plurality of detents.

10. The HVAC controller according to claim 1, wherein the controller has a number of parameters, and motion of the movable interface member relative to the central region of the front face of the controller housing selects one or more of the parameters.

11. The HVAC controller according to claim 1, wherein the controller has a number of parameters, and motion of the movable interface member relative to the central region of the front face of the controller housing changes a value of one or more of the parameters.

12. The HVAC controller according to claim 1, wherein the movable interface member is formed of a rigid thermoplastic material.

13. The HVAC controller according to claim 1, wherein the movable interface member has a hole extending therethrough, and a portion of the central region of the front face of the controller housing extends at least partially into the hole.

14. The HVAC controller according to claim 13, wherein the portion of the central region of the front face of the controller housing that extends at least partially into the hole in the movable interface member includes a user interface that is visible to a user of the HVAC controller.

15. The HVAC controller according to claim 14, wherein the user interface includes a button.

16. The HVAC controller according to claim 15, wherein the user interface includes a back light button.

17. The HVAC controller according to claim 14, wherein the user interface includes the display.

18. An HVAC controller comprising:
a controller housing having a front face with a central region;
a liquid crystal display in the central region of the front face of the controller housing; and
an annular shaped rotatable interface member disposed around at least part of the central region of the front face of the controller housing, and forming part of the front face of the controller housing, wherein the rotatable interface member rotates relative to the central region of the front face of the controller housing, wherein rotation of the rotatable interface member can be used to adjust one or more operating parameters of the HVAC controller, at least one of the adjusted parameters being displayed on the liquid crystal display.

19. An HVAC controller comprising:
a controller housing having a front face with a central region;
a liquid crystal display disposed in the central region for displaying an operating parameter of the HVAC controller; and
a rotatable interface member extending around the central region of the controller housing, the rotatable interface member being rotatable relative to the central region, wherein rotation of the rotatable interface member can be used to select one or more operating parameters of the HVAC controller for display on the liquid crystal display.

20. The HVAC controller of claim 19 further comprising a button disposed in the central region of the front face.

21. The HVAC controller of claim 20 wherein the button is a back light button for activating a back light for the liquid crystal display.

22. An HVAC controller comprising:
a controller housing having a front face with a central region;
a liquid crystal display disposed in the central region displaying an operating parameter of the HVAC controller; and
a rotatable interface member extending around the central region of the controller housing, the rotatable interface member being rotatable relative to the central region, wherein rotation of the rotatable interface member can be used to adjust the operating parameter that is displayed on the liquid crystal display.

23. The HVAC controller of claim 22 further comprising a button disposed in the central region of the front face.

24. The HVAC controller of claim 23 wherein the button is a back light button for activating a back light for the liquid crystal display.

* * * * *